Aug. 14, 1928.

S. S. GROTTA 1,680,735

GLASS FEEDING METHOD AND APPARATUS

Filed July 31, 1924  3 Sheets-Sheet 1

Witness:
William T. Barker Jr.

Inventor:
Sidney S. Grotta
by W. H. Strauss
Atty.

Aug. 14, 1928.
S. S. GROTTA
1,680,735
GLASS FEEDING METHOD AND APPARATUS
Filed July 31, 1924  3 Sheets-Sheet 2
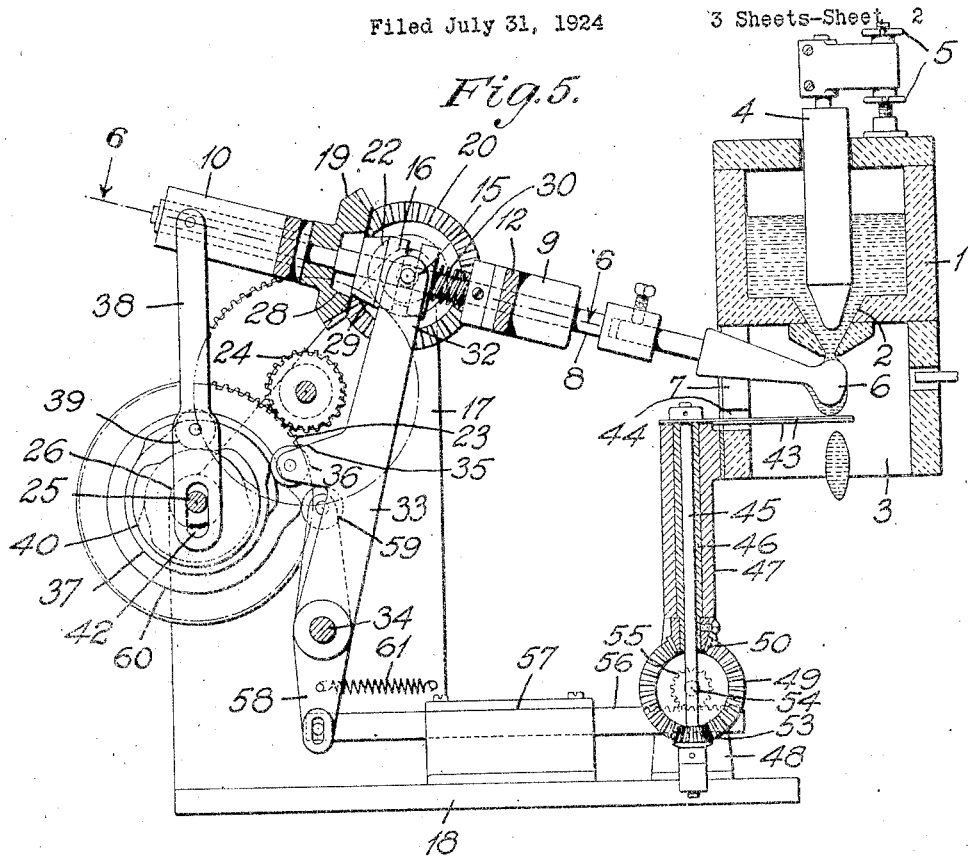
Fig. 5.
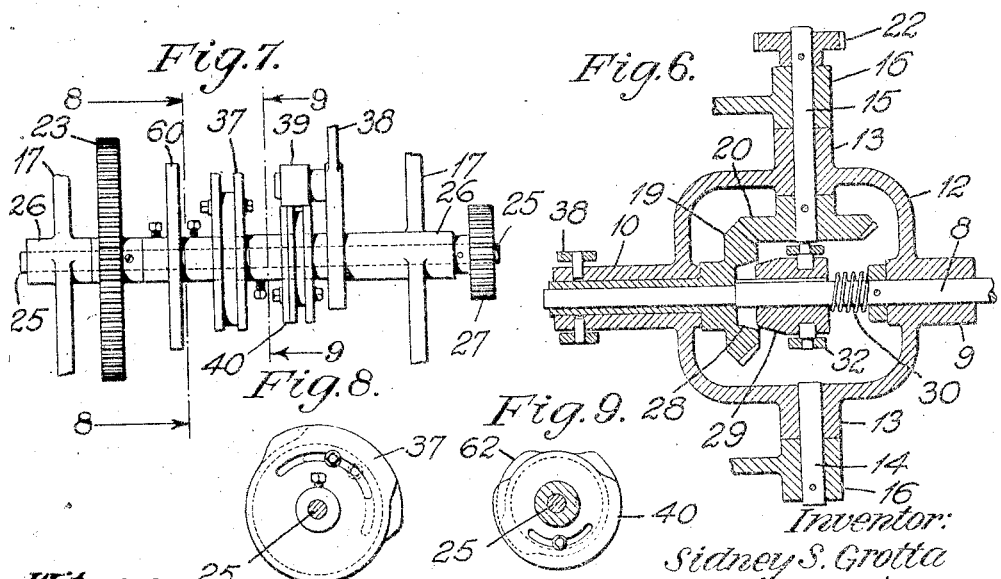
Fig. 7.   Fig. 6.
Fig. 8.   Fig. 9.
Witness:
William T. Barker Jr.
Inventor:
Sidney S. Grotta
by W. H. Smiss
Atty.

Aug. 14, 1928.

S. S. GROTTA 1,680,735

GLASS FEEDING METHOD AND APPARATUS

Filed July 31, 1924  3 Sheets-Sheet 3

Witness:
William T. Barker Jr.

Inventor:
Sidney S. Grotta
by W. H. Honiss
Atty.

Patented Aug. 14, 1928.

1,680,735

UNITED STATES PATENT OFFICE.

SIDNEY S. GROTTA, OF HARTFORD, CONNECTICUT, ASSIGNOR TO HARTFORD-EMPIRE COMPANY, OF HARTFORD, CONNECTICUT, A CORPORATION OF DELAWARE.

GLASS-FEEDING METHOD AND APPARATUS.

Application filed July 31, 1924. Serial No. 729,305.

This invention relates to the art of feeding molten glass, and it has particular relation to the glass feeding system in which separate mold charges, of predetermined size and shape, are delivered successively to a forming machine.

One of the objects of the present invention is to provide an apparatus, of the character described, embodying a gathering element which is movable to and from a position in proximity to the feeding outlet of the apparatus in order to interrupt the flow of glass therethrough, and which includes means for varying the duration of the dwell at each end of the stroke of the gathering element and the duration of its rotative movement, in order to regulate the quantity of glass accumulating thereon and the size and shape of the resulting mold charge.

Another object of the invention is to provide a method of feeding glass in which a gathering implement, such as a punty, is utilized to receive and control the flow of glass through the outlet of a container by successively moving the implement to a position remote from the outlet, to permit a predetermined quantity of the glass to issue from the outlet and to collect upon the implement, and then to a position in proximity to the outlet, to interrupt the flow of glass therefrom for an interval of time of sufficient duration to permit the gather on the implement to sag and to be severed therefrom in the form of a mold charge.

Other objects of the invention include such novel features of construction and arrangement as are disclosed in the accompanying specification and drawings, in which—

Fig. 5 is a side elevational view of a glass feeding apparatus embodying the invention, with the forehearth shown in vertical longitudinal section;

Fig. 6 is a fragmentary sectional plan view of the cradle and the clutch elements which control the rotative movement of the gathering element, taken on line 6—6 of Fig. 5;

Fig. 7 is a rear view illustrating the position and relation of the several actuating cams;

Fig. 8 is a detail elevational view, partially in section, taken on line 8—8 of Fig. 7, of the adjustable cam which controls the rotative movement of the gathering element;

Fig. 9 is a similar view of the cam which actuates the gathering element to open and close the orifice of the feeder, the section being taken on line 9—9 of Fig. 7;

Figure 1:
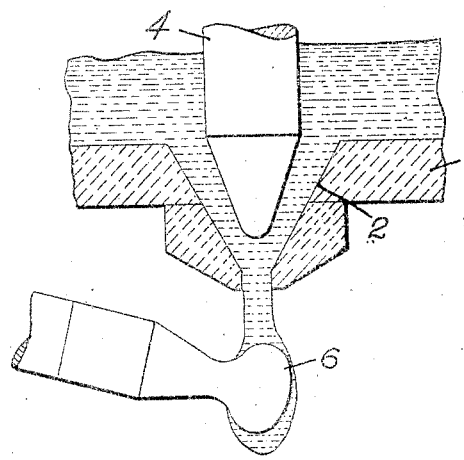
Figure 1 is a diagrammatic sectional elevation of a gathering element disposed beneath the outlet of a glass feeding apparatus, and in position to collect a quantity of glass issuing therefrom.

A glass feeding apparatus embodying the present invention is illustrated as comprising a forehearth 1 for containing a body of molten glass, this forehearth being provided with a submerged feeding outlet or orifice 2 which communicates with a chamber 3. The chamber 3 is heated by a burner or burners of any suitable type which may be located to direct a flame in the desired direction in order to maintain the glass at the proper working temperature and to prevent the glass from freezing at the outlet. The flow of glass through the outlet is regulated by a member 4 which is disposed within the forehearth and which may be adjusted vertically by means of suitable adjusting nuts 5. The glass issuing from the outlet 2 is intercepted by a gathering element, in the form of a punty 6 which is mounted for rotary and vertical movement beneath the outlet 2 with its axis of rotation extending transversely thereto. The punty 6 is provided with a shank portion which projects through a vertical opening or slot 7 formed in the front wall of the chamber 3 and is detachably and adjustably secured to one end of a shaft 8, which is journaled in bearings 9 and 10 carried by a cradle 12. The cradle 12 is provided with bearings 13 (Fig. 6) which are journaled on a pivot shaft 14 and a drive shaft 15. The shafts 14 and 15 are mounted in bearings 16 provided on a frame 17 which is carried by a base 18.

The punty 6 is intermittently rotated in order to gather a predetermined quantity of glass thereon, by means of a bevel gear 19 which is loosely mounted on the shaft 8. The gear 19 is driven by a bevel gear 20 which is fixed to the shaft 15. A spur gear 22 is also fixed to the shaft 15 and is driven by a gear 23 through the medium of suitable reduction gearing 24. The gear wheel 23 is fixed to a cam shaft 25 which is mounted in bearings 26 carried by the frame 17 and which is provided with a gear 27 for operative connection with a glass-shaping machine, not shown. The gear 19 is formed with a clutch face 28 for engagement by a movable clutch member 29 which is splined to the shaft 8. A spring 30 is provided for maintaining the member 29 in engagement with the face 28 of the gear 19 when it is desired to rotate the shaft 8 and the punty 6 carried thereby. The member 29 is periodically moved out of driving engagement with the gear 19, against the action of the spring 30, in order to intermittently interrupt the rotation of the punty 6, by means of a suitable yoke 32, which is provided on a clutch lever 33. This lever is pivotally mounted on a shaft 34, which is carried by the frame 17, and is provided with an arm 35 which carries a roller 36 for engagement with a cam 37. The cam 37 is mounted on the cam shaft 25 and is preferably adjustable in order to properly time the rotation of the punty 6 with respect to other movements of the machine, hereinafter to be described. As the cam 37 rotates, the lever 33 is rocked upon the shaft 34 and permits the clutch member 29 to periodically engage the continuously rotating gear 19, and to intermittently transmit its rotative movement to the shaft 8.

The cradle 12 is rocked upon its supporting bearings to raise and lower the punty 6 relative to the outlet 2, in order to control the flow of glass through the outlet, by means of a rod 38, which is pivotally connected at its upper end to the bearing 10 and which is provided with a roller 39 for engagement with a cam 40 carried by the cam shaft 25. This cam is adjustable in order to vary the time of the vertical movement of the punty 6. The lower end of the rod 38 is provided with a slot 42 through which the power shaft 25 extends, and which maintains the rod 38 and roller 39 in operative position with respect to the cam 40.

The shearing device consists of a pair of coacting shear blades 43, which are adapted to enter a horizontal opening 44 provided in the front wall of the chamber 3 and to sever a mold charge from the punty 6. One of the shear blades is fixed to the upper end of a vertical sleeve 46 and the other blade is fixed to a rock shaft 45 which extends through the sleeve 46. The sleeve 46 and rock shaft 45 are mounted within a bearing 47 which is supported by a bracket 48 carried by the base 18, and are rocked in opposite directions by means of a bevel gear 49, which meshes with bevel pinions 50 and 53 which are respectively secured to the lower ends of the sleeve 46 and rock shaft 45. The bevel gear 49 is fixed to a shaft 54 which is mounted in bearings (not shown) which are also carried by the bracket 48. A spur gear 55 is also fixed to the shaft 54 and is actuated by means of an intermeshing rack bar 56. The rack bar 56 is slidably mounted in a suitable guideway 57 which is carried by the base 18 of the machine, and is reciprocated by means of a lever 58 which is pivotally mounted upon the shaft 34. The lever 58 is provided with a cam roller 59, which is maintained in engagement with a cam 60 by means of a spring 61. The cam 60 is mounted upon the power shaft 25 and is preferably adjustable in order to synchronize the movements of the shears 43 and of the punty 6.

The shear blades 43 each swing through an arc of substantially 90° and consequently occupy positions exterior to the chamber 3 at the limit of their opening movement, where they may be conveniently cooled by any suitable means, not shown.

Considering the machine with the several parts occupying the positions shown in Fig. 5, the operation thereof is as follows:—

Figure 2:
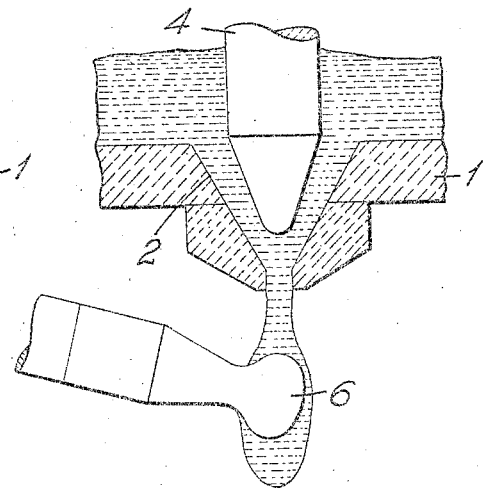
Fig. 2 is a view similar to Fig. 1, but illustrating a greater quantity of glass collected on the gathering element.
Figure 3:
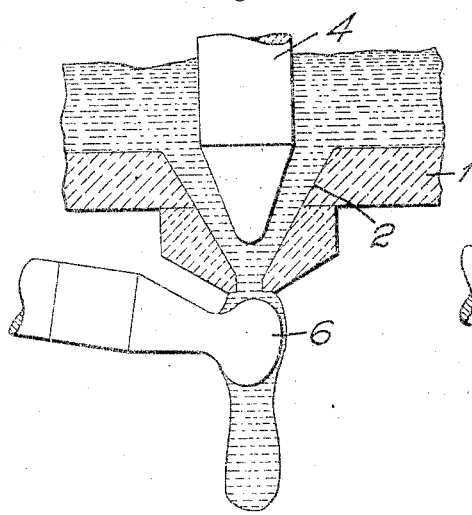
Fig. 3 is a similar view but illustrating the gathering element in position to interrupt the flow of glass from the outlet with a predetermined quantity of glass sagging therefrom.

As the cam shaft 25 rotates, the cam 40 will rock the cradle 12 about its pivotal support, and lower the punty 6 to open the orifice 2, thereby permitting glass to flow downwardly upon the punty (Fig. 1.) Substantially simultaneously with this movement of the punty, the cam 37 releases the lever 33 and permits the spring 30 to move the clutch member 29 into contact with the clutch face 28 on the continuously rotating gear 19. As soon as these members engage, the shaft 8 and the punty 6 will be caused to rotate and gather the glass as it emerges from the orifice 2 (Fig. 2). When a predetermined quantity of glass has accumulated on the punty, the latter is again raised by the cam 40 to close the outlet 2, thereby interrupting the flow of glass therethrough (Fig. 3). At substantially the same time, the cam 37 disengages the clutch member 29 from the gear 19, thereby stopping the rotation of the shaft 8 and the punty 6. The cessation of the rogear 94 is fixed to one end of a rock shaft 97 which is journaled in bearings 98 and 99 that are respectively carried by the standard 75 and a bracket 100. The shaft 97 is rocked in opposite directions in order to alternately open and close the shear blades, by means of a crank 103, which is fixed to the other end of the shaft 97 and which is oscillated by means of a reciprocable rod 104. The rod 104 is provided with a roller 105 for engagement by a cam 106 which is mounted on the shaft 70 for circumferential adjustment.

From the foregoing it will be apparent that a relatively simple and efficient glass feeding apparatus is provided in which the gathering element not only functions as a positive closure for the orifice of the feeder, but may be regulated in its movements to control the flow of glass and the size and shape of the mold charges delivered by the apparatus.

The particular embodiments of the invention illustrated and described have been selected by way of example only, and it is to be understood that various modifications, arrangements and combinations may be employed in fulfilling the spirit of the invention, as defined in the appended claims.

I claim:

1. A glass feeding apparatus comprising a container having an outlet for discharging glass downwardly, a gathering element disposed beneath said outlet in angular relation to the axial line of the outlet for supporting the glass discharged through the outlet in successive suspended masses, means for moving said implement to periodically interrupt the flow of glass from the outlet, and means for severing mold charges from said suspended masses.

2. A glass feeding apparatus comprising a receptacle for containing molten glass and having a vertical feeding outlet therein, a punty member disposed beneath said outlet and in angular relation to the axis thereof, and means for moving said punty member toward and away from said outlet to interrupt the flow of glass therethrough.

3. A glass feeding apparatus comprising a receptacle for containing molten glass and having a vertical feeding outlet therein, a vertically movable gathering element disposed beneath said outlet and in angular relation to the axis thereof, and means for moving said gathering element toward and away from said outlet to interrupt the flow of glass therethrough.

4. A glass feeding apparatus comprising a receptacle for containing molten glass and having a vertical feeding outlet therein, a gathering element disposed beneath said outlet and in angular relation to the axis thereof, and means for raising and lowering said gathering element relative to said outlet to interrupt the flow of glass therethrough.

5. A glass feeding apparatus comprising a receptacle for containing molten glass and having a feeding outlet therein, a punty member disposed adjacent to said outlet and in angular relation to the axis thereof, and means for oscillating said punty member relative to the outlet to interrupt the flow of glass therethrough.

6. A glass feeding apparatus comprising a receptacle for containing molten glass and having a feeding outlet therein, a punty member disposed adjacent to said outlet and in angular relation to the axis thereof, means for moving said punty member relative to the outlet to interrupt the flow of glass therethrough, and means for varying the frequency of such movement.

7. A glass feeding apparatus comprising a receptacle for containing molten glass and having a feeding outlet therein, a rotatable gathering element disposed outside of the receptacle and having the axis of rotation thereof extending transversely to the axis of said feeding outlet, and means for moving said gathering element relative to the outlet to interrupt the flow of glass therethrough.

8. A glass feeding apparatus comprising a receptacle for containing molten glass and having a feeding outlet therein, a rotatable gathering element disposed outside of the receptacle and having the axis of rotation thereof extending transversely to the axis of said feeding outlet, and means for moving said gathering element relative to said outlet to periodically interrupt the flow of glass therethrough.

9. A glass feeding apparatus comprising a receptacle for containing molten glass and having a feeding outlet therein, a rotatable gathering element disposed outside of the receptacle and having the axis of rotation thereof extending transversely to the axis of said feeding outlet and means for periodically moving the element toward and away from said outlet to periodically interrupt the flow of glass therethrough.

10. A glass feeding apparatus comprising a receptacle for containing molten glass and having a feeding outlet therein, and a rotatable closure member disposed with the axis of rotation thereof extending transversely to the axis of said feeding outlet, and means for moving said closure member relative to said outlet to interrupt the flow of glass therethrough.

Figure 4:
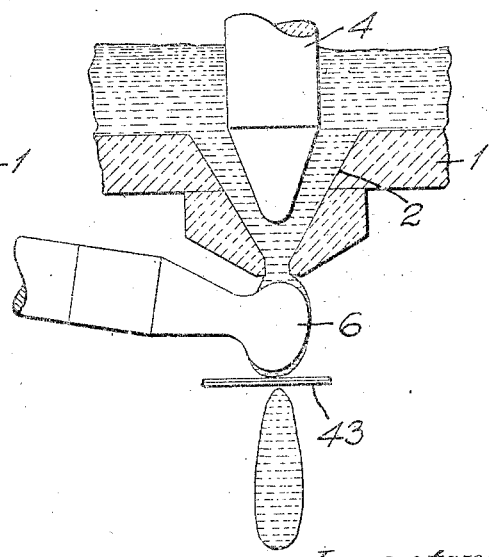
Fig. 4 is a view similar to Fig. 3, but illustrating a mold charge being separated by the severing device.
Figure 13:
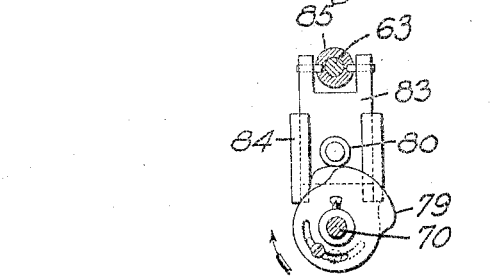
Fig. 13 is a detail view, partially in section, taken on line 13—13 of Fig. 10, of the cam which raises and lowers the gathering element with respect to the feeding outlet.

11. A glass feeding apparatus comprising a receptacle for containing molten glass and having a feeding outlet therein, a rotatable gathering element disposed outside of the receptacle and having the axis of rotation thereof extending transversely to the axis of said feeding outlet, means for moving said gathering element to intermittently open and close said outlet to periodically intertation of the punty permits the glass to sag thereon under the action of gravity to form a depending mass. This formation is augmented by the contact of the gather with the lower wall of the orifice 2, which tends to positively displace a portion of the gather on the upper part of the punty, and cause it to flow downwardly and increase the size of the depending body of glass. At this time the cam 60 actuates the shears 43, through the medium of the connecting instrumentalities, and severs the depending mass (Fig. 4) to form a mold charge which falls into a mold or upon a delivery chute, not shown. The size and shape of the mold charges thus formed may be varied by adjusting the several cams relatively to each other, in order to regulate the interval of time elapsing between the successive operations and the respective durations thereof.

In certain instances it may be desirable to delay the sagging of a gather on the punty with respect to the action of the severing device, without necessarily increasing the size of the gather or the resulting mold charge. This is accomplished through the medium of a cam 62 which, acting conjointly with the cam 40, raises the punty in two distinct movements or steps. The first of these movements occurs when the gather has reached the proper size and is caused by the cam 62 engaging the roller 39 and raising the punty to a position in which the gather formed thereon interrupts the flow of glass through the orifice. During the time that the punty occupies this position, it is rotated to prevent the gather from prematurely sagging on the punty. At the termination of a dwell of sufficient and variable duration, the cam 40 encounters the roller 39 and raises the punty the remainder of the distance to a position in which it completely closes the orifice and displaces the gather as previously described. The duration of the dwells in the described movements of the punty are regulated by adjusting the cams 40 and 62 angularly relatively to each other.

It will be understood that by advancing or retarding the action of the punty with respect to that of the severing device, drops or mold charges of different shapes and sizes may be readily obtained. For example, by adjusting the movement of the punty so that a mold charge is severed shortly after the rotation of the punty stops and before the gather has had time to sag materially, a short and relatively chunky mold charge is obtained. On the other hand, if the movement of the punty is regulated to provide a sufficient dwell prior to the action of the severing device, such as will permit the gather to sag an appreciable amount, an elongated mold charge will be the result.

In Figs. 10 to 13 inclusive, a modification of the invention is illustrated. In this particular structure the punty 6 is fixed to the end of a shaft 63, which is rotatably mounted in a bearing 64. The shaft 63 may be adjusted longitudinally in the bearing 64 in order to properly position the punty relative to the orifice 2, by any convenient means, herein shown as comprising set collars 65. The bearing 64 is provided with a bracket 66, which is pivotally connected to a bracket 67 to permit the shaft 63 and the punty 6 to be oscillated vertically to control the flow of glass from the orifice 2. The bracket 67 is carried by a standard 68 which is in turn carried by the base 69 of the apparatus. A shaft 70 is journaled in bearings 73 and 74 which are respectively carried by the standard 68 and a standard 75 which is also mounted on the base 69. The shaft 70 is driven by a gear 76, which may be operatively connected with a glass-shaping machine or with an independent source of power.

Figure 10:
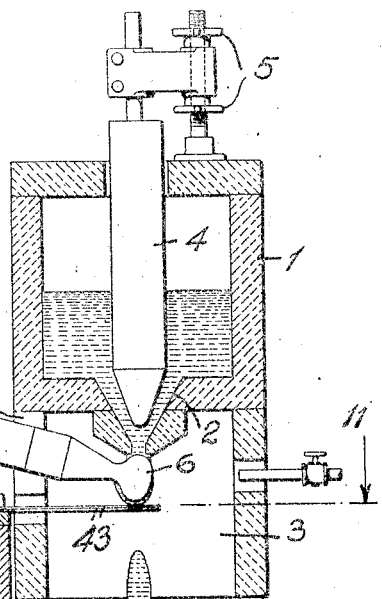
Fig. 10 is a side elevational view of a modified form of the invention.
Figure 12:
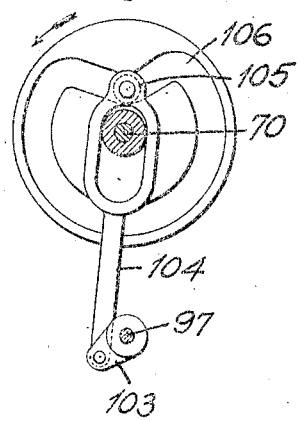
Fig. 12 is a detail view of the cam which actuates the severing device, with parts in section, taken on line 12—12 of Fig. 10.
Figure 11:
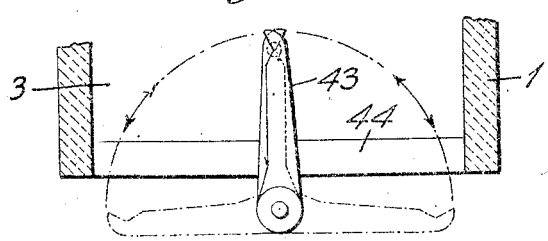
Fig. 11 is a plan view of one of the severing devices, with parts in section, taken on line 11—11 of Fig. 10.

Rotative movement is imparted to the shaft 63 and punty 6 through the medium of a friction drive wheel 77 which is fixed to the shaft 70 and which is adapted to be periodically engaged by a friction pulley 78 fixed to the shaft 63. The shaft 63 and punty 6 are intermittently raised and lowered in order to close and open the orifice 2, by means of an adjustable cam 79 which is mounted upon the shaft 70 for circumferential adjustment thereon. This cam engages a roller 80 carried by a slide 83 which is mounted for vertical movement in a guideway 84 carried by the bearing 74. The upper portion of the slide 83 is bifurcated (Fig. 13) and is pivotally connected to a sleeve 85 in which the shaft 63 is rotatably and slidably supported. When the cam 79 raises the shaft 63 in order to elevate the punty to a position in which it closes the orifice 2, the pulley 78 is lifted out of driving engagement with the wheel 77 (Fig. 10). After a mold charge is severed from the gather carried by the punty, the punty is again caused to descend to open the orifice, and the pulley 78 is simultaneously lowered into driving engagement with the wheel 77.

The severing device, in the present instance, is substantially the same as that described in connection with the structure shown in Fig. 1. One of the blades of the shears 43 is fixed to the upper end of a sleeve 88 which is mounted in a bearing 89 carried by the standard 75. The other shear blade is fixed to a rock shaft 90 which extends through the sleeve 88 and is journaled at its lower end in a bearing 93 which is also carried by the standard 75. The sleeve 88 and shaft 90 are rocked in opposite directions by means of a bevel gear 94 which meshes with bevel pinions 95 and 96 which are respectively secured to the lower ends of the sleeve 88 and the shaft 90. The bevel rupt the flow of glass therethrough, and means for regulating the period of interruption so as to vary the size of the resulting gather.

12. The method of feeding glass which comprises flowing glass through an outlet in the bottom of a container and upon a gathering element positioned beneath the outlet, rotating the element to accumulate a gather thereon, moving the element toward the outlet to interrupt the flow of glass, and severing a mold charge from the resultant mass of glass accumulated on said gathering element after the said mass has sagged below said gathering element.

13. The method of feeding glass which comprises flowing the glass through an outlet in the bottom of a container and upon a gathering implement positioned beneath the outlet, periodically rotating said element to accumulate a gather of glass thereon, moving the element toward the outlet to interrupt the flow of glass, permitting the gather to sag beneath said gathering element, and then severing a mold charge from said mass.

14. The method of feeding glass which comprises flowing glass through an outlet from a container and upon a gathering element located in line with and beneath said outlet, rotating the gather, periodically raising and lowering said gathering element to automatically interrupt the flow of glass through said orifice and to re-establish such flow, and severing a mold charge from each of the resultant masses accumulated on said gathering element after the mass has sagged beneath said gathering element.

15. The method of feeding glass which comprises flowing glass through an outlet from a container and upon a gathering element located in line with and beneath said outlet, rotating said element to prevent the accumulating mass of glass from sagging, interrupting the flow from said outlet by raising said gathering element to close said outlet, stopping the said rotation of said element to allow the accumulated mass of glass to sag below said gathering element, and then severing a mold charge from said mass.

16. The method of feeding glass which comprises flowing glass through an outlet from a container, intercepting the flow by a rotatable gathering element, rotating the gather, moving the said gathering element upward and in line with said outlet, thereby obstructing said outlet and interrupting the flow of glass, permitting the glass to sag from the gathering element, and shearing a mold charge from the depending mass of glass.

17. The method of feeding glass which comprises flowing glass through an outlet from a container, intercepting the flow by means of a gathering element located in line with and beneath said outlet, rotating said element to prevent the accumulating mass from sagging, interrupting the rotation of the gathering element, moving the said element upward to obstruct the flow from the said outlet, and thereby displacing the glass above said gathering element and increasing the mass of glass already depending from the gathering element, and severing a mold charge from the said mass.

18. In glass feeding apparatus, a container for molten glass having a discharge outlet, a movable discharge regulating member outside of said container, and means for moving said flow regulating member toward and from the outlet to and from position to stop discharge from the outlet, said means being operable to move said flow regulating member by a series of steps in one direction.

19. In glass feeding apparatus, a container for molten glass having a discharge outlet, a movable discharge regulating member outside of said container, means for moving said flow regulating member toward and from the outlet to and from position to stop discharge from the outlet, said means being operable to move said flow regulating member by a series of steps in one direction, and means for adjusting said member moving means to adjust the relative timing of said step movements.

20. In glass feeding apparatus, a container for molten glass having a discharge outlet in its bottom, a vertically adjustable flow regulating implement depending in the glass in the container substantially in axial alignment with the outlet for regulating the discharge of glass from the container, means below the outlet for intercepting the discharged glass as it issues from the outlet and for suspending the discharged glass in successive masses below the outlet, and means for severing a mold charge from each of said suspended masses.

Signed at Hartford, Conn., this 30th day of July 1924.

SIDNEY S. GROTTA.